United States Patent
Howes et al.

(10) Patent No.: US 9,633,354 B2
(45) Date of Patent: Apr. 25, 2017

(54) USER FEED DATA DELIVERY

(75) Inventors: Timothy Howes, Los Altos, CA (US);
Eric Vishria, San Carlos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 144 days.

(21) Appl. No.: 12/913,724

(22) Filed: Oct. 27, 2010

(65) Prior Publication Data

US 2012/0109922 A1   May 3, 2012

(51) Int. Cl.
*G06F 7/00* (2006.01)
*G06Q 30/00* (2012.01)

(52) U.S. Cl.
CPC ..................... *G06Q 30/01* (2013.01)

(58) Field of Classification Search
None
See application file for complete search history.

(56) References Cited

U.S. PATENT DOCUMENTS

| | | | | |
|---|---|---|---|---|
| 6,996,627 | B1 * | 2/2006 | Carden | 709/237 |
| 7,016,372 | B2 * | 3/2006 | Haartsen | 370/461 |
| 2003/0093409 | A1 | 5/2003 | Weil et al. | |
| 2005/0044076 | A1 * | 2/2005 | Wu et al. | 707/4 |
| 2005/0278540 | A1 * | 12/2005 | Cho et al. | 713/182 |
| 2007/0061711 | A1 * | 3/2007 | Bodin et al. | 715/523 |
| 2008/0086755 | A1 * | 4/2008 | Darnell | H04N 5/44543 725/105 |
| 2008/0126476 | A1 * | 5/2008 | Nicholas et al. | 709/203 |
| 2008/0155118 | A1 * | 6/2008 | Glaser et al. | 709/238 |
| 2008/0282174 | A1 * | 11/2008 | Sauve et al. | 715/748 |
| 2009/0313116 | A1 * | 12/2009 | Ashbaugh | 705/14.47 |
| 2009/0315251 | A1 * | 12/2009 | Hancock et al. | 271/18 |
| 2010/0070565 | A1 * | 3/2010 | Leblanc et al. | 709/203 |
| 2010/0094878 | A1 | 4/2010 | Soroca et al. | |
| 2010/0100607 | A1 | 4/2010 | Scholz et al. | |
| 2011/0218964 | A1 * | 9/2011 | Hagan et al. | 707/626 |
| 2012/0059795 | A1 * | 3/2012 | Hersh et al. | 707/628 |

OTHER PUBLICATIONS

PCT International Search Report and Written Opinion, PCT Application No. PCT/US11/47031, Dec. 20, 2011, 11 pages.

* cited by examiner

*Primary Examiner* — Thu Nga Nguyen
(74) *Attorney, Agent, or Firm* — Weaver Austin Villeneuve & Sampson LLP

(57) ABSTRACT

A system for delivering user specific data comprises a web browser, an application server, and a content server. The browser receives an identification associated with a user profile and transmits a login message to the application server. The application server receives the login message, determines the profile associated with the login message and the feeds or searches associated with the determined profile. Next, the application server queries the content server for data associated with the profile's feeds and searches. The application server determines from the retrieved data the data that has not been previously transmitted to the browser in connection with the profile. The application server then transmits the determined data to the browser and the browser communicates the data to a user associated with the profile.

25 Claims, 7 Drawing Sheets

USER FEED DATA DELIVERY

BACKGROUND

Field of Disclosure

The disclosure generally relates to the field of receiving online content, in particular to receiving new feed data or search results for a user.

Description of the Related Art

A web feed is a data format used for providing periodically updated content to users who have subscribed to the feed. Typically, a content distributor publishes a web feed and provides through the web feed updated data for the subscribers to the feed. Examples of web feeds include feeds that provide news headlines on a news website, weather forecasts, stock tickers, the status information of online friends, and updates made to a user's online friends' web pages.

To receive a feed, a user typically first registers the feed with an aggregator running on the user's machine or elsewhere on the network. Once a feed is registered with an aggregator, the aggregator periodically checks for any updated data available on the feed and retrieves or pulls the updated or new feed data.

Because the aggregators are periodically checking for feed data, the user receives the new data when the aggregator is ready to retrieve the data and not when the new feed data becomes available. One way to address this problem is to increase the polling frequency of the aggregator such that the aggregator is pulling newly available data frequently enough that the newly available data is retrieved within a short time of being available. However, frequent polling for new content consumes the feed provider's resources and the feed providers therefore limit the aggregators' polling frequency.

Additionally, certain data is not created for feeds and the data provider does not differentiate between the newly available data and previously available data. Therefore, a user has no way of receiving only the newly available data, i.e. data that not been previously communicated to the user.

SUMMARY

Embodiments of the invention enable a browser to present feed data or search results that have not been previously presented to the user. In one embodiment, a user profile on the browser serves as a proxy to one or more users, and the browser presents data that has not been previously presented for the profile.

A system for delivering user-specific data comprises a web browser, an application server, and a content server. The browser receives an identification associated with a user profile and transmits a login message to the application server. The application server receives the login message, determines the profile associated with the login message and determines the feeds or searches associated with the determined profile. Next, the application server queries the content server for data associated with the profile's feeds and searches. The application server determines from the retrieved data the data that has not been previously transmitted to the browser in connection with the profile. The application server then transmits the determined data to the browser and the browser communicates the data to a user associated with the profile. In this manner, the system communicates new data to the user that has not been previously communicated to a user in connection with the profile. The user therefore is not inundated with previously communicated stale data. Moreover, the application server caches the retrieved data for the profile and uses the cached data for determining undelivered data for other profiles as well. Accordingly, the system beneficially reduces the data queries for retrieving data from the feed source and the search engines.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The computing environment described herein enables delivery of user-specific data. The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
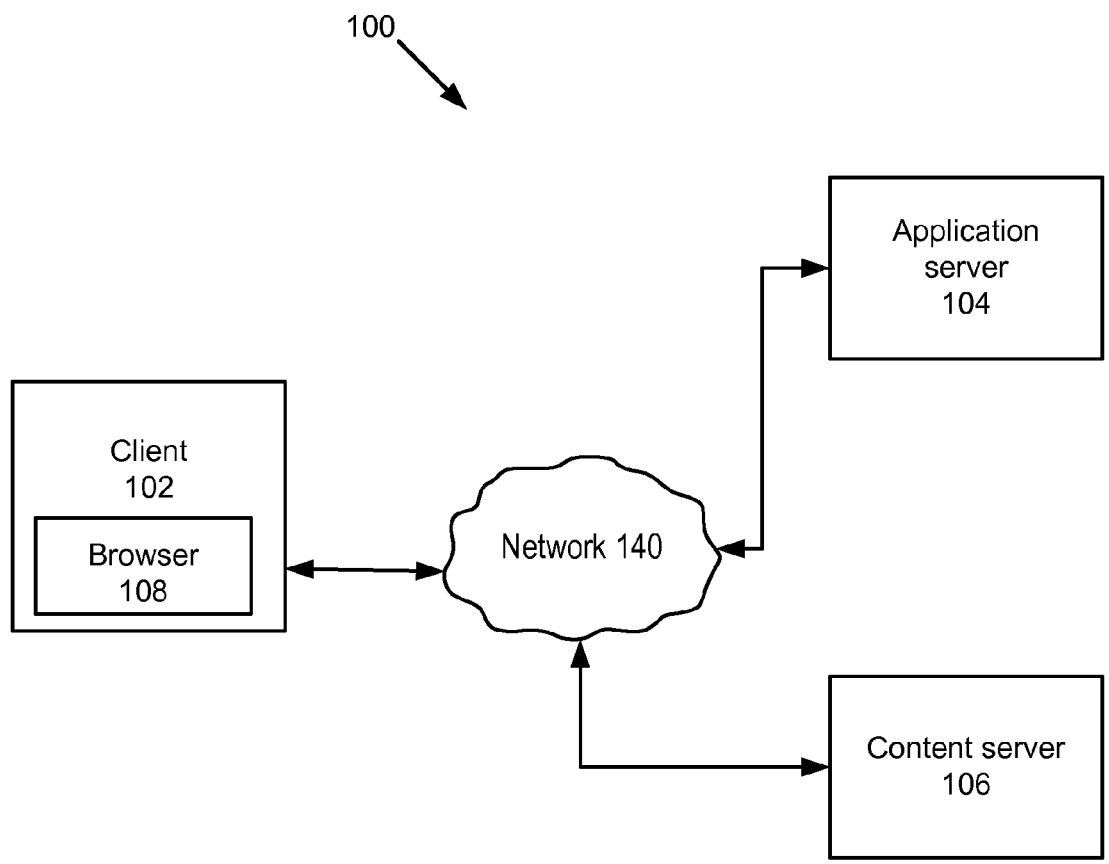
FIG. 1 is a block diagram illustrating a computing environment for delivering user-specific data, according to one embodiment.

Referring to FIG. 1, the computing environment 100 for delivering user-specific data comprises a client 102 with a browser 108, an application server 104, a content server 106 and a network 140. The client 102 is a computing device with a processor and a memory capable of running applications like browser 108. Examples of client 102 include a desktop, a laptop and a handheld computing device.

The browser 108 is an application for retrieving, communicating, and traversing online data available on various entities like the application server 104 and the content server 106. Additionally, the browser 108 receives from the application server 104 content associated with a user of browser 108. The browser 108 communicates the received content to the user.

The application server 104 is a computing system with a processor and a memory that receives and stores user data associated with the user. For example, the application server 104 stores various feeds or saved search terms associated with a user of browser 108. The application server 104 also retrieves data associated with the user's feeds or saved search terms, determines from the retrieved data the data that has not been communicated to the user and transmits the determined feed data to the browser 108 for presentation to the user.

The content server 106 is a computing device with a processor and a memory that stores online content like web pages, feed content, audio or video streams etc. The content server 106 transmits the stored content over network 140 upon receiving a request for the stored content.

The Network 140 represents the communication pathways between the client 102, the application server 104 and the content server 106. In one embodiment, the network 140 is the Internet. The network 140 can also use dedicated or private communication links that are not necessarily part of the Internet.

Overview

A user launches a browser 108 on client 102 and provides authentication information to the browser 108. The browser 108 receives user input and authenticates the user. In one embodiment, the browser 108 maintains a user authentication database (not shown) and the browser verifies the user's authentication information against the authentication information saved in the user database. In another embodiment, the browser 104 transmits the user's authentication information to the application server 104, the application server 104 authenticates the user and then transmits the authentication results to the browser 108.

After the user is authenticated, the browser 108 transmits a signal to the application server 104 informing the application server 104 that the user has logged into the browser 108. Next, the application server 104 determines the feeds or saved searches (i.e. search terms) associated with the user, determines the content for the associated feeds or searches that has not been communicated to the user and transmits the determined content to the browser 108. The browser 108 communicates the received content to the user. The application server 104 repeatedly determines data that not been previously communicated to the user and transmits or pushes to the browser 108 the determined data for presentation to the user.

The description about the browser 108 and the application server 104 assigns particular functions to one entity or another. This description and the function assignment are for illustration purposes and do not limit the server or the client to their assigned functions. Upon reading this disclosure, one of ordinary skill in the art will understand that functions described in one embodiment as being performed on the server side can also be performed on the client side in other embodiments if appropriate. Similarly, the client side functions can be performed by the server if appropriate. Additionally, the functionality attributed to a particular component can be performed by different or multiple components operating together, as deemed appropriate by the implementer.

Browser

Figure 2:
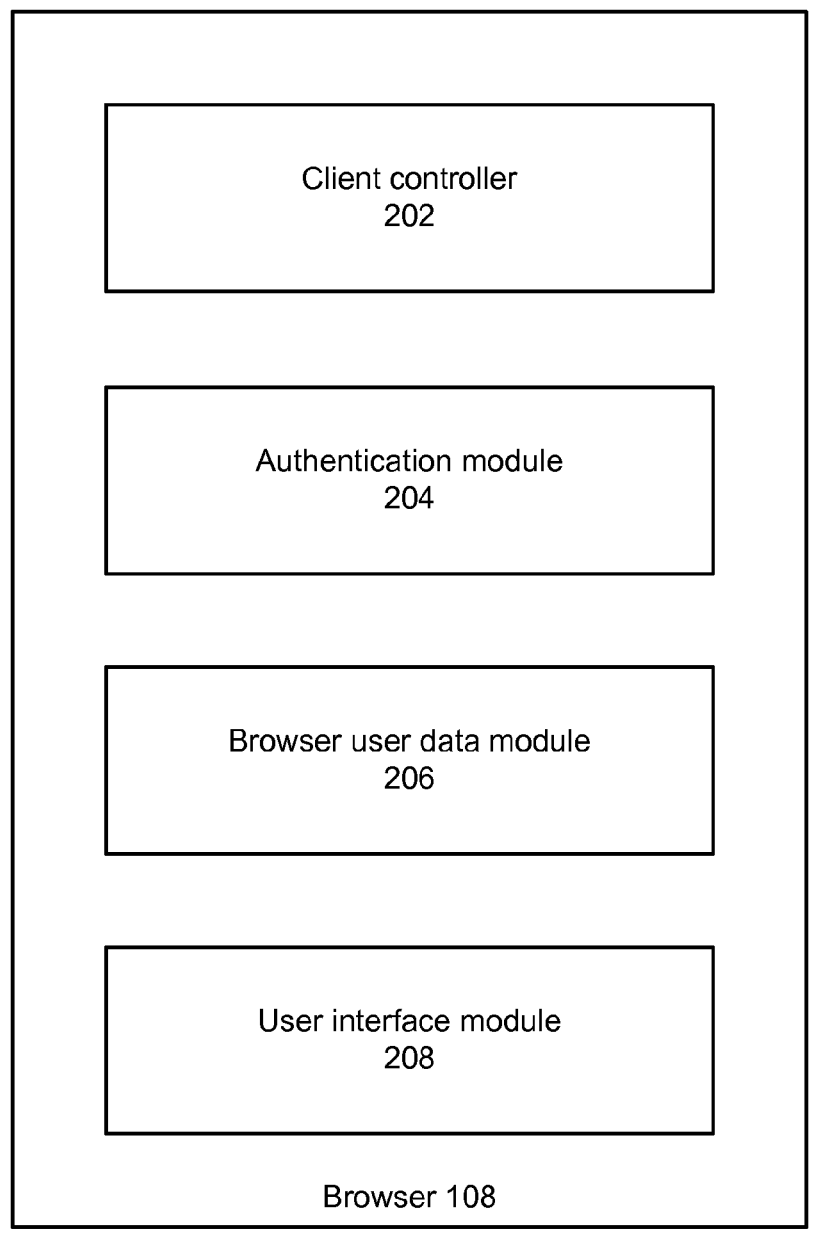
FIG. 2 is a block diagram illustrating a browser, according to one embodiment.

FIG. 2 is a block diagram illustrating the browser according to one embodiment. The browser 108 comprises a client controller 202, an authentication module 204, a browser data module 206 and a user interface module 208.

The client controller 202 directs other modules in browser 108 to implement their respective functions at appropriate time. The client controller 202 also provides an interface between the modules in browser 108 and other entities in the computing environment 100. Additionally, the client controller 202 configures the browser 108 with user data associated with a user logged into the browser 108. In one embodiment, the client controller 202 configures the browser 108 such that the chrome of the browser 108, i.e. the border of the browser 108 displays information specific to the logged in user. For example, the chrome displays feeds and saved searches associated with the user. In one embodiment, the client controller 202 configures the browser 108 such that the user specific data is displayed in an area other than the chrome.

The authentication module 204 receives the authentication data from the user and authenticates the user. In one embodiment, a user profile on the browser serves as a proxy to one or more users and the authentication module 204 receives the authentication data for the user profile instead of a particular user. The authentication data comprises a user identification and alternatively a corresponding password. The user identification and the password are alpha-numeric strings associated with the user. In one embodiment, the authentication module 204 stores authentication data for one or more users and the authentication module 204 verifies the authentication data received from the user against the stored authentication data. In another embodiment, the authentication module 204 transmits the authentication data to the application server 104 or another authenticating entity (not shown) and receives a verification of the authentication data.

After the authentication module 204 authenticates the user, the client controller 202 configures the browser 108 for the authenticated user. To configure the browses 108, the client controller 202 retrieves data for the authenticated user from the browser user data module 206.

The browser user data module 206 stores user data for various users of browser 108. Examples of stored data for a user include data feeds or saved searches associated with the user. The data feeds are either selected by the user or associated with the user based on the user's browsing activity. The saved searches are based on search terms that are run repeatedly to determine pertinent search results as they become available. Additionally, in one embodiment, the browser user data module 206 stores feed data and search results received from the saved feeds or searches.

In one embodiment, the user data mentioned above is initially stored in the application server 104 and not in the browser user data module 206. In this embodiment, the client controller 202 receives the user data from the application server 104 and stores the received data in browser user data module 206. In another embodiment, the browser user data module 206 stores user data for frequent users of the browser 108 and repeatedly updates the stored data from the application server 104 or as it receives the data from another module in the browser 108. Alternatively, the browser user data module 206 updates the stored data based on the user's browsing activity or other user input received through the user interface module 208. Additionally, in another embodiment, the browser 108 does not include the authentication module 204, the user is not authenticated, and the browser user data module 206 still stores information associated with a user. In this embodiment, the browser user data module 206 treats all users of browser 108 as one common user and associates the stored information with that common user.

The user interface module 208 provides an interface between the user and the application server 104 or the other modules in the browser 108. In one embodiment, the user interface module 208 receives from the application server 104 the feed data or the search results for the user and presents the received data to the user in the chrome of the browser 108. In another embodiment, the user interface module 208 receives a web page with the feed data or the search results and the user interface module 208 displays the web page to the user. In yet another embodiment, the user interface module 208 first displays a message on the browser 108 informing the user that the feed data or search results are available. The user interface module 208 then displays the available data after receiving a user input indicating a request for such data. After the data is presented to the user, the user interface module 208 transmits a message to the application server 104 indicating that the data has been presented to the user. In one embodiment, the message is also transmitted to the browser user data module 206.

This message helps the application server 104 and/or the browser user data module 206 to differentiate between the user data already presented to the user and the user data not yet presented to the user. Such differentiation beneficially allows the application server 104 to push to the browser 108 the user data not previously presented to the user. Accordingly, the user does not get bogged down by the previously presented data and the user can focus on the newly available data.

Application Server

Figure 3:
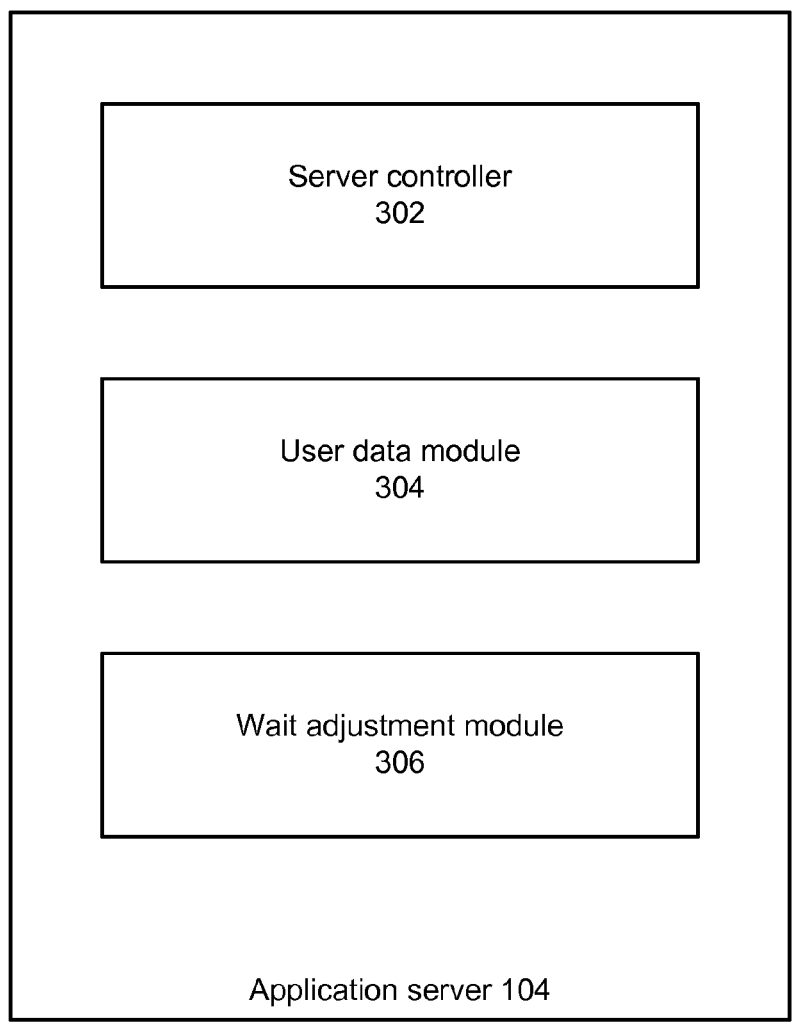
FIG. 3 is a block diagram illustrating an application server, according to one embodiment.

FIG. 3 is a block diagram illustrating the application server 104 according to one embodiment. The application server 104 comprises a server controller 302, a user data module 304 and a wait adjustment module 306.

The server controller 302 directs other modules in the application server 104 to implement their respective functions at appropriate time. Additionally, the server controller 302 provides an interface between the modules in the application server 104 and other entities in the computing environment 100. For example, the server controller 302 receives from the browser 108 a message indicating that a user has logged into the browser 108. The server controller 302 then transmits this message to one or more modules in the application server 108.

The user data module 304 stores and transmits to the browser 108 the data for the users of the browser 108. The user data module 304 stores a user profile corresponding to each user and these profiles include feeds and searches associated with a user. The user data module 304 accesses a user profile, determines the feed data and search results that have not been presented to the user and transmits the determined data to the browser 108. Because the user data module 304 does not wait on receiving a request for the data from the user, the user data module 304 transmits or pushes the current data to the browser 108 as it becomes available. Additionally, in one embodiment, the user data module 304 beneficially caches the feed data and the search results for a user. This cached feed data and the search results are used for other users without retrieving the same data from a feed or running the search again. The user data module 304 therefore beneficially makes fewer data requests for multiple users to a data source. In this manner, the user data module 304 reduces the load on the data source and manages data retrieval constraints placed by the data source.

Figure 4:
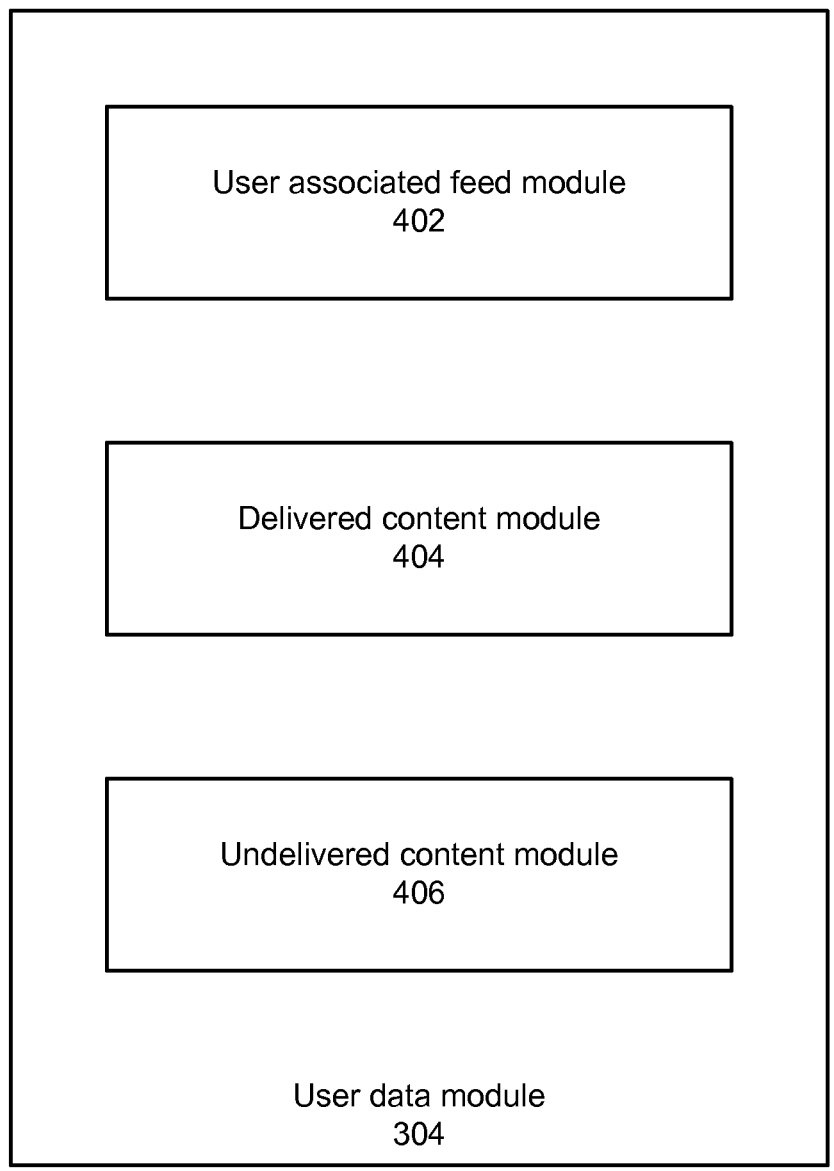
FIG. 4 is a block diagram illustrating a user data module, according to one embodiment.

Referring to FIG. 4, the user data module 304 comprises a user associated feed module 402, a delivered content module 404 and an undelivered content module 406. The user associated feed module 402 comprises the feeds associated with the user. In one embodiment, the user selects the feeds on the browser 108 and the browser 108 transmits the selected feeds and a user identification to the user associated feed module 402. Alternatively, the user identification is transmitted to the server controller 302 separately after the user of browser 108 is authenticated. The user associated feed module 402 receives and stores the selected feeds from the browser 108 and the user identification from the server controller 202 or the browser 108. Similarly, the user associated feed module 402 also receives and stores the saved searches for a user from the browser 108. These saved feeds and searches are later retrieved by the undelivered content module 406 to retrieve feed data or search results for the user.

The delivered content module 404 stores information about the data that has already been communicated to the user of browser 108. This stored information enables the undelivered content module 406 to determine the undelivered content as described below. Examples of such information includes a user identification, the delivered data itself, a timestamp or a sequence number associated with the delivered data, a hash value or another identifier that identifies the delivered data. The delivered content module 406 receives from the undelivered content module 406 the above mentioned information about the already communicated data.

The undelivered content module 406 retrieves the feed data or search results for the user and determines the data that has not been presented to the user. The undelivered content module 406 retrieves the feed data or search results through various interfaces, like function calls, provided by the feed providers and the search engines. After retrieving the data, the undelivered content module 406 determines the retrieved data that has not been presented to the user. The undelivered content module 406 determines such data based on various properties of the data like the data source or a time attribute associated with the data. For example, if the undelivered content module 406 has not previously received data from a source for a user, the data currently retrieved from the source is marked as undelivered data for the user.

Additionally, the undelivered content module 406 classifies the retrieved data for the user, i.e. the feed data or the search results, in two categories: ordered data and disordered data. The ordered data includes an order characteristic, like a timestamp or a sequence number, indicating the order in which the data was created or published. The disordered data does not include this order characteristic. For the ordered data, the undelivered content module 406 classifies the retrieved data as undelivered based on the order characteristic. For example, the undelivered content module 406 queries the delivered content module 404 and determines the timestamp associated with the latest transmitted data from the source to the browser 108 for the user. If the timestamp associated with the retrieved data is greater than the timestamp associated with the latest delivered data, the undelivered content module 406 marks the data as undelivered data. Otherwise, in one embodiment, the retrieved data is marked as delivered data.

In one embodiment, the undelivered content module 406 transmits the order characteristic to the data source and the data source delivers only the undelivered data to the undelivered content module 406. The undelivered content module 406 therefore does not have to sort the delivered data for a user from the received data. For example, the undelivered content module 406 transmits a timestamp in the function call to the data source for retrieving data. Consequently, the data source only returns the data created or published after a time represented by the received timestamp.

In one embodiment, part or all of the retrieved ordered data with a later timestamp overlaps with a part or all of the ordered data with an earlier timestamp. In this embodiment, the ordered data is treated in the same manner as the disordered data. For the disordered data, the undelivered content module 406 determines the undelivered content in the retrieved disordered data by comparing the retrieved disordered data with previously delivered disordered data. The undelivered content module 406 therefore retrieves from the delivered content module 404 the previously delivered disordered data for the user. The undelivered content module 406 then compares the retrieved data and previously delivered data to determine the undelivered disordered data. In one embodiment, instead of comparing all of the retrieved data, the undelivered content module 406 compares only part of the retrieved data, like the header of the retrieved data, with a corresponding part of the previously delivered data. In another embodiment, to determine the undelivered disordered data, the undelivered content module 406 compares the hash values for the retrieved and previously delivered data. If the compared part of the retrieved data or the hash value corresponding to the retrieved data matches a corresponding part or hash value of the previously delivered data, the undelivered content module 406 marks that data as delivered data. Otherwise, the data is marked as undelivered data.

The undelivered content module 406 also accounts for the computational resources required for comparing the delivered data and the retrieved data. Because more computational resources are required to compare more data, the undelivered content module 406, in one embodiment, filters the disordered data based on one or more factors relevant to the disordered data. For example, the disordered data like results for a search performed by a search engine can include hundreds of links to various web objects. The undelivered content module 406 filters such search results based on a rank or an order provided by the search engine and selects a configurable or pre-determined top number of results for comparison with the delivered data. The remaining search results are neither compared nor later communicated to the user. Such search results are not communicated to the user because the results are less likely to be relevant for the user. A typical user does not browse past the top few search results from a search engine. The undelivered content module 406 beneficially draws from this user behavior to efficiently use computational resources and deliver more relevant content to the user.

After the undelivered content module 406 has determined the undelivered content for a user, the undelivered content module 406 transmits the determined content to the browser 108. The undelivered content module 406 also transmits information about the transmitted content to the delivered content module 404. Again, examples of such information includes a user identification, the delivered data itself, a timestamp or a sequence number associated with the delivered data, a hash value or another identifier that identifies the delivered data. In one embodiment, the undelivered content module 406 transmits this information to the delivered content module 404 after receiving a signal from the browser 108 indicating that the content has been communicated to the user.

The undelivered content module 406 repeatedly determines and transmits the undelivered content for a user to the browser 108. After transmitting the undelivered content, the undelivered content module 406 waits for a configurable amount of time before determining data for the user again. Referring to FIG. 3, the wait adjustment module 308 configures this wait period based on the currently available data from the feed or the search engine. As feed data or search results are determined for the user, the amount of new feed data or search results for the user gradually decreases over time. For example, additional data from a feed about a company or new search results from a search for news about the company may gradually decrease after the initial feed data or search results. On the other hand, certain events like a new product release by the company may trigger a stream of new data about the company. Accordingly, the wait adjustment module 308 helps the undelivered content module 406 adapt to such activity by adjusting its wait period before the undelivered content module 406 determines data for a user again.

The wait adjustment module 308 adjusts the wait period based on the amount of undelivered data retrieved from a feed source or a search engine. The wait period is initially a pre-determined or configurable amount of time the undelivered content module 406 waits before retrieving data from a feed source or a search engine. After determining the undelivered data, if the retrieved amount of undelivered data from a source is beyond a threshold, the wait adjustment module 308 decreases the wait period by an amount of time. On the other hand, if the retrieved amount of undelivered data is below a threshold, the wait adjustment module 308 increases the wait period by an amount of time. In this manner, the wait adjustment module 406 beneficially adjusts, based on the amount of newly retrieved data, the number of times the undelivered content module 406 queries a data source. Accordingly, the wait adjustment module 406 beneficially reduces the resources required by the undelivered content module 406 to retrieve the data and the resources required by the data source to provide the data.

Data Delivery Methodology

Figure 5:
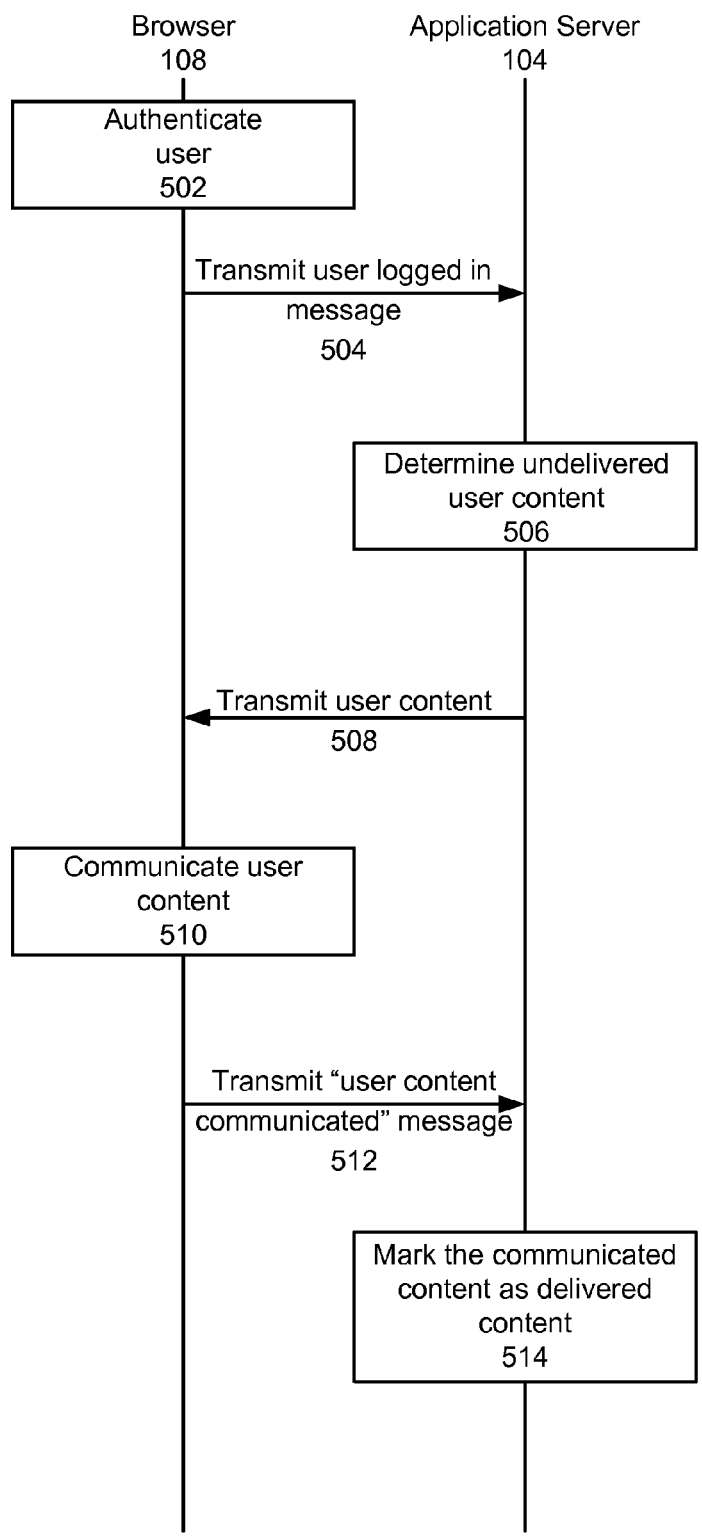
FIG. 5 is a trace diagram illustrating a method for delivering user-specific data, according to one embodiment.

FIG. 5 is a trace diagram illustrating a method for delivering user-specific data according to one embodiment. The browser 108 receives authentication information from the user, authenticates 502 the user and transmits 504 a signal indicating the user's login to the application server 104. Responsive to receiving the signal, the application server 104 determines 506 the undelivered content associated with the user's feeds and saved searches. Next, the application server 104 transmits 508 the determined content to the browser 108 and the browser 108 communicates 510 the received content to the user. In one embodiment, the browser 108 then transmits 512 to the application server a message indicating that the content has been communicated to the user. The application server 104 then marks 514 the communicated content as delivered content.

Figure 6:
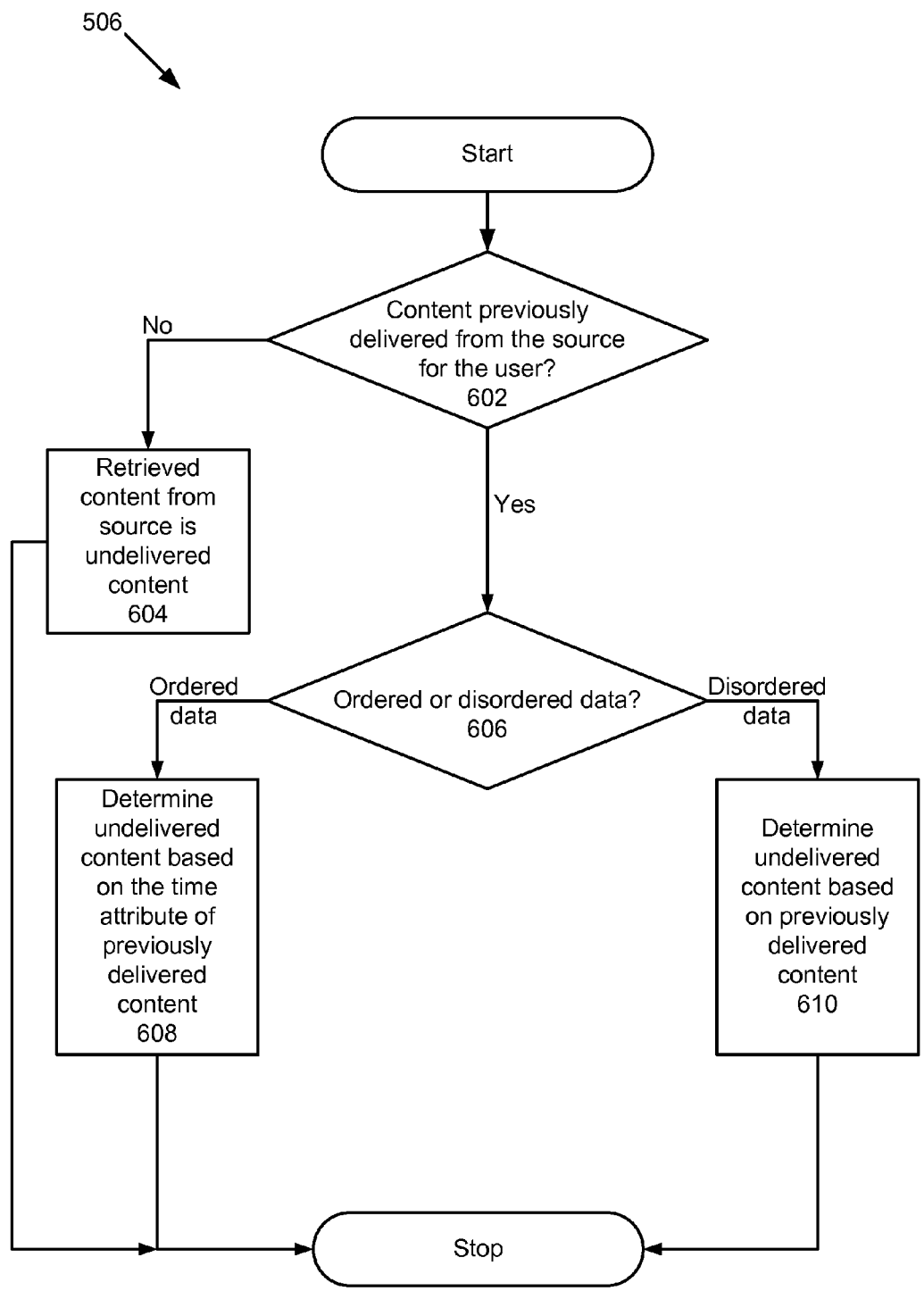
FIG. 6 is a flow diagram illustrating a method for determining undelivered data for a user, according to one embodiment.

FIG. 6 is a flow diagram illustrating a method for determining undelivered data for a user according to one embodiment. The application server 104 retrieves data from a data source and then determines if the retrieved data has been previously delivered for a user to the browser 108. To make this determination, the application server 104 determines 602 if the data source has previously delivered data for the user. If not, the application server 104 marks 604 the retrieved data as undelivered data for the user. Otherwise, the application server 104 next classifies 606 the retrieved data as ordered or disordered data. For ordered data, the application server 104 determines 608 whether the retrieved data is undelivered data based on one or more characteristics of the ordered data. For example, the application server 104 compares the timestamps associated with the retrieved ordered data and previously transmitted data to determine if the retrieved ordered data has been previously communicated to the user. If the timestamps do not match, the data has not been communicated to the user. Otherwise, the data has been communicated to the user. For disordered data, the application server 104 determines 610 whether the retrieved data is undelivered data based on content of the retrieved disordered data. Accordingly, the application server 104 compares part or all of the retrieved disordered data with the previously transmitted data. If the data matches, the retrieved data has been previously communicated to the user. Otherwise, the retrieved data has not been communicated to the user.

Figure 7:
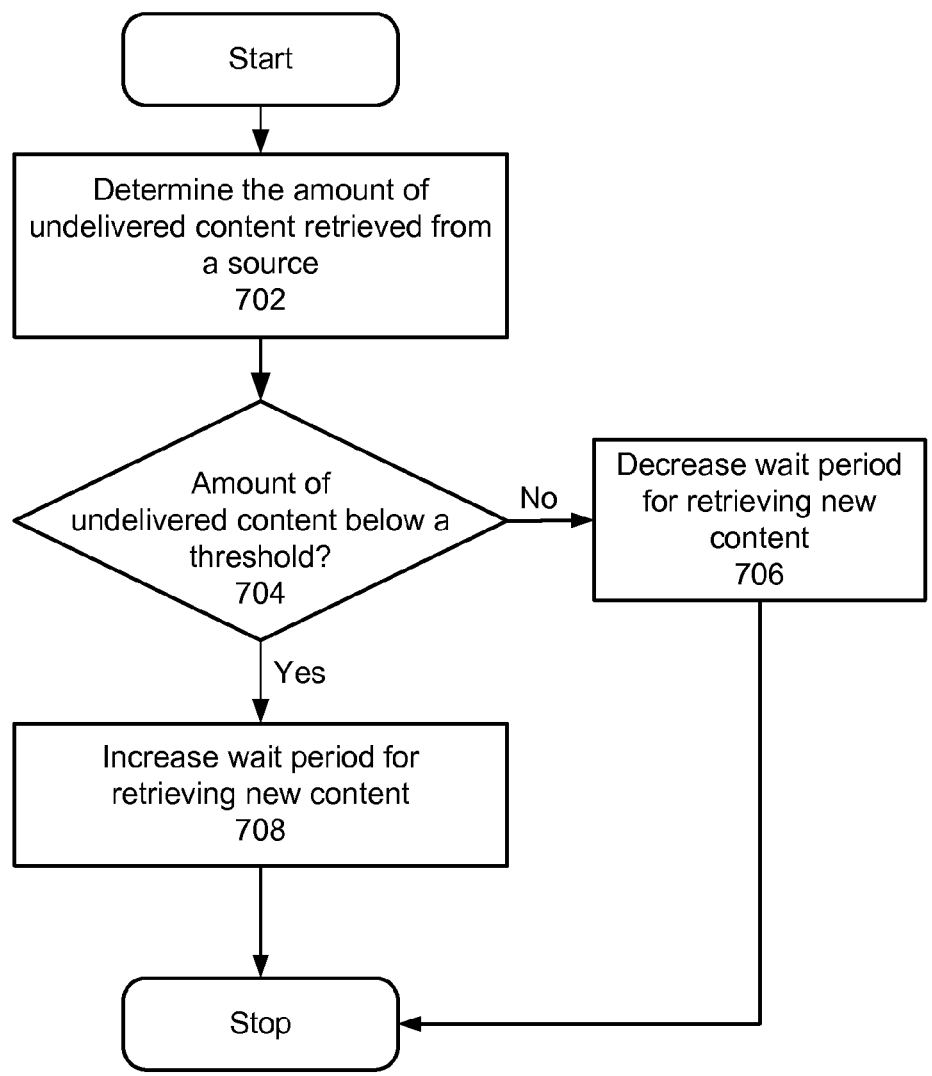
FIG. 7 is a flow diagram illustrating a method for adjusting period to wait before retrieving and delivering new data to the user, according to one embodiment.

As described above, in one embodiment, the application server 104 after transmitting the undelivered data adjusts its wait period and waits for the adjusted period before retrieving any new data from the data source. In one embodiment, the application server 104 first retrieves new data and then waits for the wait period before transmitting the data for the user to the browser 108. FIG. 7 is a flow diagram illustrating a method for adjusting that wait period according to one embodiment of the present invention. To determine the wait period, the application server 104 determines 702 the amount of undelivered data retrieved from a data source. If the application server 104 determines 704 that the amount is below a threshold, the application server 104 increases 708 the wait period. Otherwise, the application server 104 decreases 706 the wait period. The application server 104 then waits for the adjusted wait period before retrieving or transmitting the new data for the user to the browser 108.

As described above, the threshold for the amount of retrieved data is static, but the wait period for retrieving or transmitting new data is dynamically adjusted based on the amount of data retrieved from a data source. This dynamic adjustment of wait period beneficially enables the application server 104 to learn from its past attempts in retrieving undelivered data and poll the data sources accordingly. For example, if the threshold is 100 KB and the current wait period is five seconds, the application server 104 may decrease the wait period to poll a source to four seconds upon retrieving 110 KB of undelivered data from the source. The application server 104 therefore deduces from the 110 KB of undelivered data, 10 KB over the threshold, that an event may have caused the availability of new data and the data source is likely to have additional undelivered data upon next retrieval. Subsequently, on the next retrieval, the application server 104 may increase the wait period back to five seconds upon retrieving 70 KB of undelivered data. Upon retrieving 70 KB of undelivered data, i.e. 30 KB below the threshold, the application server 104 deduces that the new data resulting from the event has likely been collected and the data source is unlikely to have additional new data available from the event. Accordingly, the application server 104 returns to the wait period of five seconds and maintains the five second wait period until another event creates newly available data from the data source. In one embodiment, the application server 104 keeps increasing the wait period until the application server 104 retrieves amount of new data that exceeds the 100 KB threshold. The wait period therefore may be increased to a minute or even more.

As mentioned above, the functionality of the browser 108 and the application server 104 has been described for illustration purposes and the above described functionality can be implemented either in the browser 108 or the application server 104. For example, the application server 104 is illustrated above as including the user data module 304 and the wait adjustment module 306. In one embodiment, these modules 304-306 are included in the browser 108. Accordingly, the authentication module 204 authenticates the user, the user data modules 306 retrieves new user data associated with the user's feeds and saved searches, and the new data is then presented to the user. Next, the wait adjustment module 306 in browser 108 adjusts the period to wait before retrieving and communicating new data to the user.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
   accessing a profile associated with a browser used to access feed content, wherein the profile identifies a plurality of feeds to which the profile has subscribed;
   determining that one or more feeds from the plurality of feeds contain one or more feed items that have not been delivered in connection with the profile;

transmitting the one or more feed items to the browser associated with the profile;
comparing an amount of data in the one or more feed items to a threshold amount;
adjusting a wait period based upon a result of comparing the amount of data in the one or more feed items to the threshold amount;
retrieving data associated with at least one of the plurality of feeds from at least one data source, wherein retrieving the data includes polling the data source after the wait period;
classifying the data into two categories, the two categories including ordered data and disordered data, wherein the ordered data includes an order characteristic and the disordered data does not include the order characteristic of the ordered data;
determining from the data one or more additional feed items that have not previously been transmitted to the browser associated with the profile, wherein determining from the data one or more additional feed items that have not previously been transmitted to the browser associated with the profile includes:
for the data classified as disordered data, comparing hash values corresponding to the disordered data with hash values corresponding to previously delivered data that has been delivered to the browser associated with the profile; and
for the data classified as ordered data, determining whether the ordered data has previously been delivered to the browser associated with the profile based, at least in part, on the order characteristic; and
transmitting, to the browser associated with the profile, the one or more additional feed items that have not previously been transmitted to the browser associated with the profile.

2. The computer-implemented method of claim 1, wherein the transmission of the one or more feed items and the additional feed item are separated by at least the adjusted wait period.

3. A computer-implemented method for delivering undelivered content for one or more profiles, the method comprising:
determining a feed associated with a browser used to access feed content, the browser being associated with one of the profiles;
determining one or more data items associated with the feed, the one or more data items not previously delivered to the browser;
transmitting the one or more data items to the browser;
retrieving data associated with the feed from a data source;
classifying the data into two categories, the two categories including ordered data and disordered data, each item of the ordered data having a particular order characteristic and each item of the disordered data not having the particular order characteristic of the ordered data;
for each of the additional data items classified as disordered data, determine whether the additional data item has previously been transmitted to the browser by comparing a hash value corresponding to the additional item classified as disordered data with hash values corresponding to previously delivered data that has been delivered to the browser associated with the profile;
for each of the additional data items classified as ordered data, determining whether the additional data item has previously been delivered to the browser associated with the profile based, at least in part, on a value of the order characteristic; and
transmitting, to the browser, the one or more additional data items that have not previously been delivered to the browser associated with the one of the profiles.

4. The computer-implemented method of claim 3, wherein the undelivered one or more data items are determined based, at least in part, on content of the undelivered one or more data items.

5. The computer-implemented method of claim 3, wherein the undelivered one or more data items are determined based, at least in part, on a unique identifier assigned to the undelivered one or more data items.

6. The computer-implemented method of claim 3, the method further comprising:
adjusting a wait period by a processor based, at least in part, on an amount of data in the one or more feed items, wherein retrieving data includes polling the data source after the wait period.

7. A computer program product for delivering undelivered content for one or more profiles, the computer program product comprising a non-transitory computer-readable storage medium containing computer program code for:
determining feeds associated with a browser used to access feed content, the browser being associated with one of the profiles;
determining one or more undelivered data items associated with the feeds, the undelivered data items not previously delivered to the browser;
retrieving data associated with the feeds from at least one data source;
classifying the data into two categories, the two categories including ordered data and disordered data, each item of the ordered data having a particular order characteristic and each item of the disordered data not having the particular order characteristic of the ordered data;
for each of the additional data items classified as disordered data, determine whether the additional data item has previously been transmitted to the browser by comparing a hash value corresponding to the additional data item of disordered data with hash values corresponding to previously delivered data that has been delivered to the browser associated with the profile;
for each of the additional data items classified as ordered data, determining whether the additional data item has previously been delivered to the browser associated with the profile based, at least in part, on a value of the order characteristic; and
transmitting, to the browser, the one or more additional data items that have not previously been delivered to the browser.

8. The computer program product of claim 7, wherein the undelivered data items are determined based, at least in part, on a timestamp associated with the undelivered data items.

9. The computer program product of claim 7, wherein the undelivered data items are determined based, at least in part, on content of the undelivered data items.

10. An apparatus, comprising:
at least one processor; and
a memory, at least one of the processor or the memory being configured to:
determine a feed associated with a browser used to access feed content;
determine one or more data items associated with the feed, the one or more data items not previously delivered to the browser;

transmit the one or more data items to the browser;
retrieve data associated with the feed from a data source;
classify the data into two categories, the two categories including ordered data and disordered data, each item of the ordered data having a particular order characteristic and each item of the disordered data not having the particular order characteristic of the ordered data;
for each of the additional data items classified as disordered data, determine whether the additional data item has previously been transmitted to the browser by comparing a hash value corresponding to the additional item of the disordered data with hash values corresponding to previously delivered data that has been delivered to the browser associated with the profile;
for the each of the additional data items classified as ordered data, determine whether the additional data item has previously been delivered to the browser associated with the profile based, at least in part, on a value of the order characteristic; and
transmit, to the browser, the one or more additional data items that have not previously been delivered to the browser.

11. The apparatus of claim 10, at least one of the processor or the memory being further configured to:
increase a wait period upon determining that an amount of data in the one or more data items is less than a particular threshold amount;
wherein retrieving data includes polling the data source after the wait period.

12. The apparatus of claim 10, at least one of the processor or the memory being further configured to:
decrease a wait period upon determining that an amount of data in the one or more data items is greater than a particular threshold amount;
wherein retrieving data includes polling the data source after the wait period.

13. The method of claim 1, wherein the order characteristic is a timestamp or sequence number.

14. The method of claim 1, wherein the order characteristic of the ordered data indicates an order in which ordered data items were created or published.

15. The apparatus of claim 10, wherein the order characteristic is a timestamp or sequence number.

16. The apparatus of claim 10, wherein the order characteristic of the ordered data indicates an order in which ordered data items were created or published.

17. The computer program product of claim 7, wherein the order characteristic is a timestamp or sequence number.

18. The computer program product of claim 7, wherein the order characteristic of the ordered data indicates an order in which ordered data items were created or published.

19. The method of claim 1, wherein the order characteristic comprises a timestamp, and wherein determining whether the ordered data has previously been delivered to the browser associated with the profile includes comparing the timestamp associated with the latest delivered data and the timestamp associated with the retrieved data.

20. The method of claim 1, wherein retrieving data comprises transmitting the order characteristic to the at least one data source.

21. The apparatus of claim 10, at least one of the processor or the memory being further configured to:
comparing an amount of data in the one or more data items to a threshold amount; and
adjusting a wait period based upon a result of comparing the amount of data in the one or more data items to the threshold amount;
wherein retrieving the data includes polling the data source after the wait period.

22. The computer program product of claim 7, further comprising:
comparing an amount of data in the one or more undelivered data items to a threshold amount; and
adjusting a wait period based upon a result of comparing the amount of data in the one or more undelivered data items to the threshold amount;
wherein retrieving the data includes polling the data source after the wait period.

23. The method of claim 3, wherein classifying the data into two categories comprises classifying a data item according to whether the data item comprises a value for the particular order characteristic.

24. The method of claim 3, wherein the hash values corresponding to the disordered data comprises hash values of content of the disordered data and the hash values corresponding to the previously delivered data comprises hash values of content of the previously delivered data.

25. The method of claim 3, wherein determining whether the ordered data has previously been delivered to the browser associated with the profile based, at least in part, on the order characteristic comprises:
determining whether a value of the order characteristic of the ordered data is greater than the value of the order characteristic of latest delivered data for the browser.

* * * * *